United States Patent [19]

Harder et al.

[11] 4,341,636
[45] Jul. 27, 1982

[54] TREATMENT OF WASTEWATER

[75] Inventors: Ursula M. Harder; Karl D. Kaswinkel; James W. Gould; Jon K. West, all of Gainesville, Fla.; Michael J. Wynn, Latham, N.Y.

[73] Assignee: General Electric Company, Gainesville, Fla.

[21] Appl. No.: 191,191

[22] Filed: Sep. 26, 1980

[51] Int. Cl.³ .................... B01D 15/04; B01D 23/14
[52] U.S. Cl. ................................ 210/662; 210/669; 210/670; 210/685; 210/694; 210/290
[58] Field of Search ............... 210/662, 664, 665–667, 210/669, 670, 688, 694, 702, 724, 725, 774, 806, 807, 181, 290, 503, 912–914, 685, 686

[56] References Cited

U.S. PATENT DOCUMENTS

| | | | |
|---|---|---|---|
| 659,485 | 10/1900 | Maignen | 210/290 |
| 2,678,288 | 5/1954 | Cotton et al. | 210/677 |
| 3,258,059 | 6/1966 | MacWilliams | 159/10 |
| 3,331,661 | 7/1967 | Boiston et al. | 23/121 |
| 3,444,079 | 5/1969 | Bowers | 210/685 |
| 3,557,961 | 1/1971 | Stuart | 210/290 |
| 3,655,587 | 4/1972 | Bouchard et al. | 210/678 |
| 3,676,336 | 7/1972 | O'Brien et al. | 210/662 |
| 3,725,266 | 4/1973 | Haviland | 210/912 |
| 3,736,253 | 5/1973 | DeAngelis et al. | 210/669 |
| 3,985,648 | 10/1976 | Casolo | 210/669 |
| 4,024,055 | 5/1977 | Blann | 210/724 |
| 4,025,426 | 5/1977 | Anderson et al. | 210/662 |
| 4,140,747 | 2/1979 | Sadan | 423/163 |
| 4,147,626 | 4/1979 | Findlay et al. | 210/724 |
| 4,179,493 | 12/1979 | Sadan | 423/279 |
| 4,259,082 | 3/1981 | Gianforcaro et al. | 23/302 T |

Primary Examiner—Ivars C. Cintins
Attorney, Agent, or Firm—Pollock, Vande Sande & Priddy

[57] ABSTRACT

Process for treating wastewater, which includes measuring the pH of the wastewater, adjusting the pH to about 10–11; filtering the wastewater; and subjecting the wastewater to ion-exchange treatment; and certain filter media.

27 Claims, 2 Drawing Figures

4,341,636

TREATMENT OF WASTEWATER

DESCRIPTION

TECHNICAL FIELD

The present invention is concerned with the treatment of wastewater in order to remove heavy metal materials, alkali metal materials, and alkaline earth metal materials therefrom. The process of the present invention is particularly applicable for treating wastewater used in various processing procedures in the manufacture of batteries, and especially cadmium-nickel rechargeable batteries and lead-acid rechargeable batteries. The process of the present invention is especially designed to reduce the operating investment costs while at the same time providing a relatively quick and efficient purification process. Moreover, the process of the present invention makes it possible to reuse a significant amount of the water treated.

BACKGROUND ART

In the manufacture of batteries, as in many industrial manufacturing processes, large quantities of water are employed which become contaminated. For instance undesired levels of heavy metals, alkali metals, alkaline earth metals, and organic materials contaminate water employed in the manufacture of batteries. This water must be treated so that it can be recycled and reused and/or discharged into nearby natural waterways.

DESCRIPTION OF INVENTION

The present invention is concerned with a process for treating wastewater, and particularly wastewater which contains undesired levels of heavy metals, alkali metals, alkaline earth metals, and/or organic materials. The process includes measuring the pH of the wastewater and then adjusting the pH to about 10–11 for primary precipitation of metals. The wastewater with a pH of 10–11 is then subjected to filtration primarily for the removal of residual heavy metals therefrom. The filtered wastewater is subjected to ion-exchange treatment. Preferably the filtered wastewater is subjected to cation-exchange treatment for removal of alkali metals and/or alkaline earth metals and/or salts thereof. The wastewater is then preferably contacted with activated carbon employed to remove organic materials contained in the wastewater. The wastewater is then preferably contacted with an anion-exchange material which removes acidic ions from the wastewater. In addition, wastewater used to regenerate the ion-exchange materials which generally have a concentration of at least about 2% of total dissolved solids can be subjected to evaporation. Next, such wastewater can be centrifuged in order to provide a solid anhydrous waste material. In addition, the present invention is concerned with a filter media containing a layer of anthracite coal on top of a layer of silica sand on top of a layer of quartz rock.

DESCRIPTION OF BEST AND VARIOUS MODES FOR CARRYING OUT INVENTION

Figure 1:
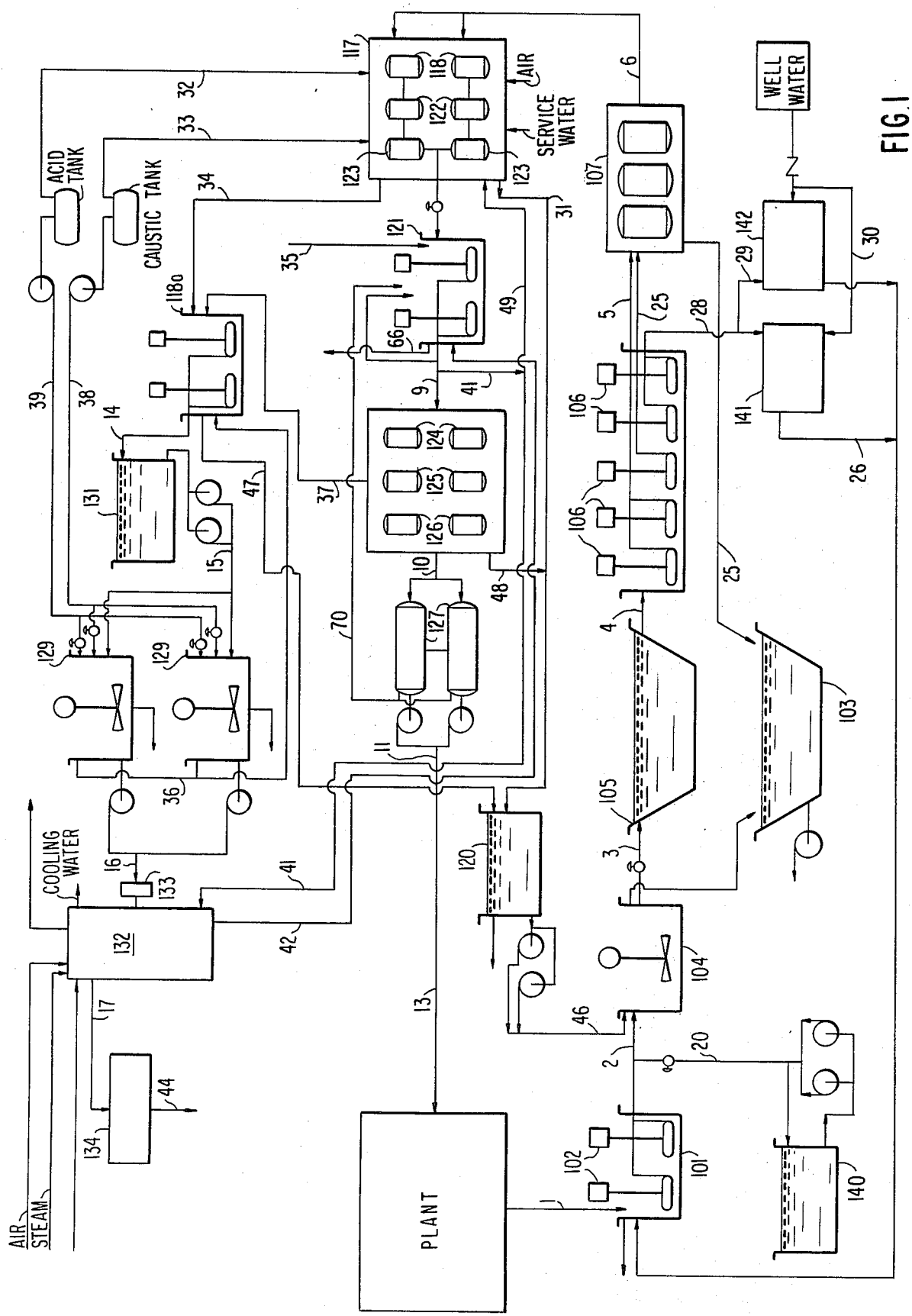
FIG. 1 is a schematic diagram of the sequence of a preferred process for carrying out the present invention.

For convenience, the process of the present invention will be described with particular applicability to the treatment of wastewater from the manufacture of nickel-cadmium batteries and/or lead-acid batteries. Reference to FIG. 1 illustrates an overall schematic diagram of a preferred process for carrying out the present invention. In particular, wastewater from the manufacturing facility for nickel-cadmium batteries is conveyed via conduit 1 to a mixing tank 101 containing mixing means 102. The wastewater can be from the manufacturing of nickel and/or cadmium battery plates, from various boilers employed, from cleaning nickel plates prior to coating, from equipment leaks, and pretreated waste having reduced lead content from manufacturing of lead-acid batteries.

A typical flow rate for this stream is about 100 to about 300 gpm (gallons/minute), and preferably about 150 to 160 gpm with the maximum rate being about 450 gpm for a typical nickel-cadmium manufacturing facility. The temperature is about 70° to 110° F., the pH about 2 to 12, and the solids content typically about 850 ppm to about 1500 ppm.

Moreover, well water and/or a portion of the wastewater can be conveyed or recycled to mixing container 101 via conduit 27. The amount of material from conduit 27 is about 150 to about 200 gallons per minute with the peak being about 300 gallons per minute.

The wastewater stream is conveyed using lifters 102 to tank 104 via conduit 2. Tank 104 can be referred to as a "diverter". For best results, the diverter preferably has a capacity of about 2½ times greater than the normal flow rate to prevent large flows of abnormal effluent from entering the normal treatment system. The pH, conductivity, and flow rate are measured in diverter 104. In the event the flow rate is above the maximum permitted for the capacity of the system, a portion of the stream is diverted or directed to a holding facility or impoundment pond 103, and is manually analyzed and a determination is made as to what type of treatment to subject the water in holding facility 103. Metals which settle out of solution are subsequently dredged out of the holding facility 103.

The pH of the stream is also measured, and if it is below about 10, it is increased to about 10–11 and preferably to about 10.5 by the addition of a base such as a sodium hydroxide solution. The base can be added via conduit 20 from a service tank 140. A typical base is a 66° BE (25% by weight) sodium hydroxide aqueous solution having a pH of at least about 14. Typically about 3–10 gallons of the base are added via conduit 20.

In addition, the conductivity of the stream is measured at this point, and if it is higher than about 1500 micromhos, the stream is diverted to the holding facility 103.

The wastewater stream introduced via conduit 2 has a heavy metals content of at least about 100 ppm; an alkali metals and alkaline earth metals combined content of at least about 750 ppm; up to about 10 ppm of organic compounds, such as phenols, alcohols, and naphthas; and an acidic ion content of at least about 750 ppm, such as sulfate and nitrate ions.

Typically, such stream can have a heavy metal content of about 100 to about 1000 ppm; a total alkali metal and alkaline earth metal content of about 750 to about 1500 ppm; about 1 to about 10 ppm organic compounds, and about 750 to about 1500 ppm of acid ions. The term "metal content" and similar terms used herein refer to metals per se and the metal portion of metal compounds such as salts. Heavy metals removed by the process of the present invention include those generally having atomic weights of at least 55. The major heavy metal contaminants include Group VIII metals such as iron, cobalt, nickel; Group IIB metals such as zinc and cadmium, and Group 1B metals such as copper; and Group IVA metals such as lead. It has been noted that the maximum amount of lead in the wastewater to be treated according to a preferred aspect of the present invention is about 50 ppm for most efficient operation. Accordingly, wastewater from, for example, lead-acid battery manufacture is pretreated to reduce the lead content before being treated according to the process of the present invention.

Examples of alkali metals are sodium and potassium, and exaples of alkaline earth metals are calcium and magnesium.

Providing the waste stream at this stage with a pH of about 10–11 is beneficial in facilitating the precipitation or settling out of heavy metals present in the wastewater. The major amount of most of the heavy metals settles out in the form of hydroxides. Prior to the present invention, it was felt that deliberately increasing the pH of a wastewater composition which contained significant quantities of alkali materials was not suitable particularly in view of the difficulties experienced in removing alkali materials. However, the sequence of steps employed according to the present invention and the subsequent demineralization procedures, as will be discussed hereinbelow, are such that a pH of about 10–11 is most beneficial in the present invention.

In addition, at least partially treated wastewater, depending upon material flow balances as will be discussed hereinbelow, can be added to diverter 104 via conduit 46 from holding tank 130.

The waste stream to be processed is conveyed via conduit 3 to a settling tank or pond 105 whereby a major portion of the heavy metals as hydroxides is permitted to settle out of the wastewater solution. Certain of the heavy metals are not removed at this stage, such as the lead, but are subsequently removed as will be discussed hereinbelow.

The residence time in settling zone 105 is about 4 to about 6 days and preferably about 5 to about 6 days. The flow rate into the settling zone is typically about 400 to about 500 gallons per minute and preferably about 450 to about 460 gallons per minute with a typical maximum being about 750 gallons per minute of wastewater.

The temperature of the waste stream at this stage is typically about 70° to about 110° F., and the pH about 10–11.

The following is a complete analysis of a typical stream in settling or holding facility 105:

| | |
|---|---|
| Ammonia Nitrogen (mg/L) N | 0.059 |
| Calcium (mg/L) Ca | 2.08 |
| Magnesium (mg/L) Mg | 1.02 |
| Sodium (mg/L) Na | 262 |
| Potassium (mg/L) K | 23.1 |
| Iron (mg/L) Fe | <0.01 |
| Nickel (mg/L) Ni | 0.155 |
| Cadmium (mg/L) Cd | 0.021 |
| Lead (mg/L) Pb | <0.04 |
| Total Organic Carbon (mg/L) C | <1.0 |
| Total Dissolved Residue (mg/L) | 951 |

-continued

| | |
|---|---|
| Specific Conductance (umhos/cm) | 1450 |
| pH (Units) | 10.1 |
| Alkalinity Forms (mg/L as $CaCO_3$) | |
| Total | 292 |
| $OH^-$ | 6 |
| $CO_3^{-2}$ | 159 |
| $HCO_3$ | 127 |
| Sulfate (mg/L) $SO_4$ | 210 |
| Chloride (mg/L) Cl | 0.4 |
| Reactive Silica (mg/L) $SiO_2$ | 5.0 |
| Nitrite plus Nitrate (mg/L) $NO_3$ | 102 |
| Sulfamates (mg/L) | 0.2 |
| Cation (meg/L) | 12.2 |

The wastewater stream is then conveyed via conduit 4 through lift stations 106 and then via conduits 5 to a filter medium 107. The lift stations make it possible to eliminate pressure control valves on the demineralizers 117, since the pressure is only slightly dependent on flow with the particular types of pumps employed which are preferably vertical cantilever pumps from Nagle.

Typical flow rates of the waste stream through conduit 4 are about 400 to about 500 gallons per minute, with a typical maximum being about 750 gallons per minute. The temperature of the stream is typically about 70°–110° F. with a solids content of 0.1% by weight.

Typical residence time in the lift stations 106 is about 10 to about 20 minutes. Typical flow rates of the stream through conduit 5 is about 1400 to about 1500 gallons per minute with a typical maximum being about 1500 gallons per minute.

The filter medium 107 is employed to remove residual heavy metal materials and to reduce the turbidity of the wastewater composition.

Figure 2:
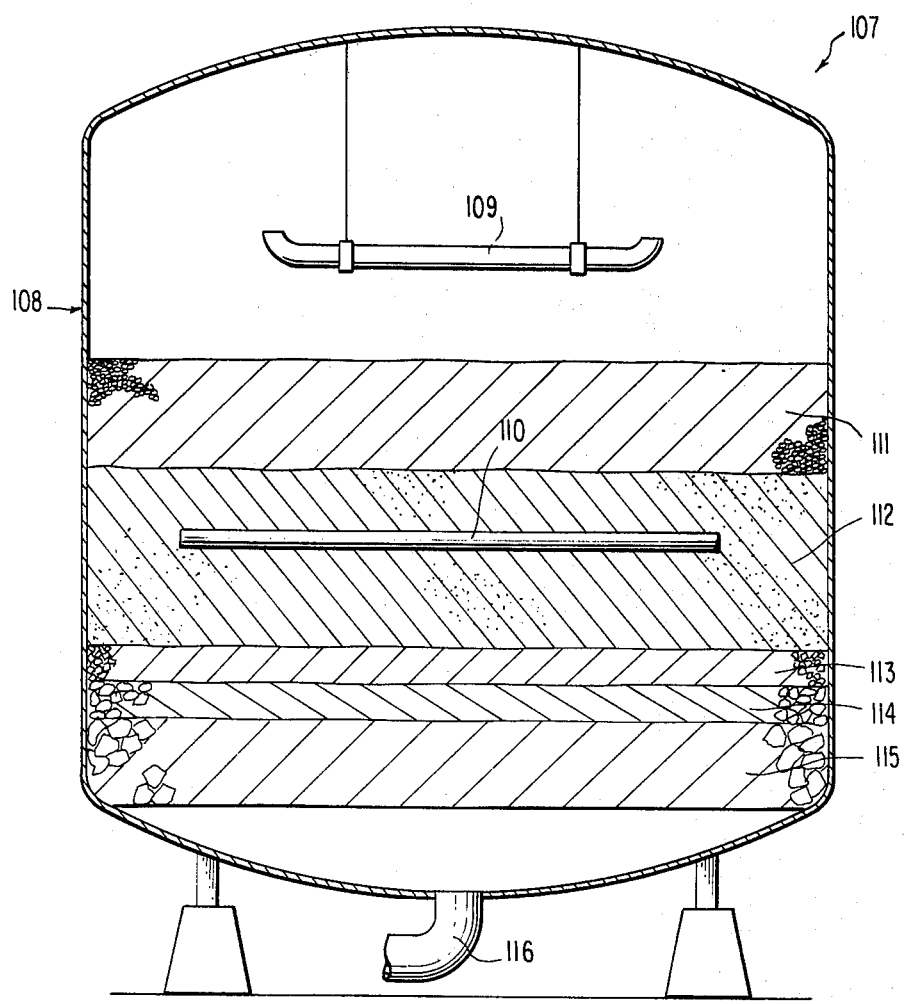
FIG. 2 is a schematic diagram of a filtration unit which can be employed in the present invention.

FIG. 2 illustrates a typical filter 107 wherein numeral 107 refers generally to the filter. The filter includes walls 108 which can, for instance, be made of steel or any other construction material resistant to alkali. A typical unit can be about ten feet in diameter and includes a distributor 109 at the top portion for inserting the waste water, and an air wash distributor 110 for removing occluded material from the filter medium. The preferred filter medium includes a layer of anthracite coal 111 on top of a layer of silica sand 112, on top of layers of quartz rock 113, 114 and 115. The anthracite coal preferably has a particle size of about 1 to about 1.5 mm; the silica sand preferably about 0.45 to about 0.55 mm; and 3 separate layers of quartz rock with the uppermost layer having a preferred size of about 1/16 to about 3/16 inch, the middle layer having a preferred size about ¼ to about ½ inch, and the bottom layer having a preferred size about ¾ to about 1½ inch. Typical bed depths of the anthracite, silica sand, and quartz rock are in a ratio of about 0.8:1.1 with the layers of quartz rock being about 0.5:0.5:1. Typical bed depths for a ten foot diameter filter are about 16 inches of anthracite, about 20 inches of silica sand, about 5 inches of 1/16 to about 3/16 quartz rock, about 5 inches of ¼ to ½ inch quartz rock, and about 10 inches of ¾ inch to about 1½ inch quartz rock.

Typical flow rates through each filter are about 200 to about 250 gpm.

It has been observed that as the calcium carbonate level builds up on the sand, the efficiency of cadmium removal increases. The best results are obtained when the bed particles have a thin film of $CaCO_3$ generally amounting to at least about 10% by weight of the filter media, and more usually about 15–20% by weight of the filter media. With the typical flow rates and types of wastewater discussed hereinabove, a build-up of $CaCO_3$ on the particles usually occurs in about 8 to about 10 weeks of use of the system. The filter 107 generally removes about 70 to about 80% of the heavy metals from the wastewater.

Although a series of three filters are shown in FIG. 1, it should be understood that any number can be employed depending upon the size of filter, amount of material to be processed, and desired flow rates. Three filters have been shown, since this amount is most convenient for the typical sizes and flow rates exemplified herein.

If desired, the filter 107 can be backwashed for cleaning, such as by flowing a stream of wastewater from lifters 106 via conduit 25 through said filters and conveying said stream from said filter via conduit 25 to facility 103. In a typical operation this occurs about every two weeks. Typical amounts of this stream are about 1000 to about 1200 gallons per minute. Also, if desired, an air wash can be used to assist in the cleaning of filters 107.

Depending upon flow rates and system capacity, a portion of the stream can be diverted via conduit 28 and recycled to tank 101. If desired, the stream can be conveyed to air scrubbers 141 and/or 142 to remove residual amounts of $HNO_3$ from the air before being recycled to tank 101 via conduits 29, 26 and 27. The presence of the scrubbers at this stage reduces water consumption. The water, because of its high pH, is very useful for removing $HNO_3$ from the ambient air from the preparation of the battery plates. The scrubbers can operate by spraying the water stream into air and directing the air and water spray to baffles which cause separation of the water and treated air. These scrubbers are used to remove only a small amount or residual amount of the nitric acid, such as about 0.05% of the toal nitric acid originally present. The major amount is removed prior to this. The presence of the scrubbers also facilitates the stabilization and mixing at the diverter 104, since it already has a pH of about 10 to about 11, thereby reducing the amount of the total material in the diverter 104 which must be adjusted to the necessary pH. Back-up well water can also be conveyed to tank 101 via conduit 30, air scrubbers 141 and/or 142 and conduits 26 and 27 if more water is needed in the plant than is being processed.

A partially purified wastewater stream is removed from the filter via outlet 116 and is conveyed to the ion-exchange demineralizer unit 117 via conduit 6. Typical flow rates are about 200 to about 475 gallons per minute. The solids content of the stream leaving filter 107 is about 0.1% by weight. The pH of this stream is about 10–11.

The ion-exchange demineralizer system preferably includes in series a cation-exchange medium 118, an activated carbon filter medium 122, and an ion-exchange medium 123. The cation-exchanger 118 removes alkali metal ions and alkaline earth metal ions such as the sodium ion from the wastewater. The preferred cation-exchange materials include the acid-form molecular sieves; acid-form zeolites; sulfonated coals such as sulfonated coal peat; sulfonated lignite, and sulfonated oxidized coal; phosphonated coal; and acid-form ion-exchange or cation polymeric materials such as the nuclear sulfonic, the methylene sulphonic, the carboxylic, the phosphonic, the phosphorus, the phosphoric, and the phenolic polymeric materials. Among the ion-exchange polymeric materials in the acid form are sulfonated cured copolymers of styrene and divinylbenzene, copolymers of an acrylic acid (e.g.,—acrylic or methacrylic acid) and divinylbenzene, the reaction products of phenol, acrolein, and the semiamide of oxalic acid, polystyrene methylene sulfonic acid, sulfonated phenol-aldehyde condensates, polystyrene-phosphorus acid, polystyrene-phosphoric acid, phosphoric acid phenolic condensates. It should further be understood that the ionic characteristics of the polymeric materials is primarily determined by the polar groups, and is quite independent (except for physical properties) of the nonpolar portion of the resin structure.

A typical cation-exchange medium 118 suitable for the purposes of the present invention is available from Permutit under the trade designation Q100 Permutit. A typical bed for the flow rates discussed herein is about 8' diameter by 8' depth.

Next, the wastewater is conveyed to activated carbon filter medium 122 for removal of various organic materials present in the wastewater stream. The amount of organic materials remaining in the wastewater stream after contact with the activated carbon is less than about 1 ppm.

Activated carbon or charcoal is an amorphous form of carbon characterized by high adsorptivity for gases, vapors, and colloidal solids. The carbon is obtained by the destructive distillation of wood, nut shells, animal bones, or other carbonaceous material. It is "activated", for example, by heating to 800°–900° C. with steam or carbon dioxide, which results in a porous internal structure (honeycomblike). The internal surface area of activated carbon averages about 10,000 square feet per gram. The density is from 0.08 to 0.5. A typical bed for the flow rates discussed herein is about 8' diameter by 7' depth.

The treated wastewater stream is then conveyed to anion-exchange media 123 whereby sulfates, nitrates and other acidic ions are removed from the wastewater. Substantially all of the acidic ions, except for any carbonic acid and/or silicic acid present, is removed by anion-exchange 123. If necessary, carbonic acid can be removed by a conventional degasser.

The anion-exchange media 123 is an ion-exchange material in the base form and can have the same nonpolar portion as that discussed hereinabove for the cation-exchange material and, instead of being in the acid form, includes as the exchange ion a weak basic ion such as hydroxyl ions and amine ions. A typical anion-exchange material is available from Permutit under the trade designation permutit S445. A typical bed size for flow rates discussed herein is about 8' diameter by 8' depth.

It is preferred for best results that the sequence of a cation-exchange media followed by an activated carbon media followed by an anion-exchange media be observed. In particular, the activated carbon bed operates best at reduced pH values, and, therefore, removal of the alkali metal and alkaline earth metal ions by the cation-exchange material prior to contact with the activated carbon bed is extremely important. Furthermore, since organic materials tend to adversely affect the anion-exchange materials employed, the activated carbon which removes the organic materials from the waste stream is advantageously placed in front of the anion-exchange material.

The ion-exchange beds are operated until regeneration is required which usually is about 12 hours based on a usage of about 180,000 gallons per day. The regeneration for the cation-exchange bed is achieved by an acid such as sulfuric acid and for the anion-exchange bed is a basic material such as sodium hydroxide. In particular, the acid can be conveyed to the cation-exchange bed via conduit 32 and the basic material can be conveyed to the anion-exchange bed via conduit 33. Regeneration can be carried out by introducing regenerating composition into about the middle of the bed and forcing it upward and out the upper portion of the bed.

The carbon bed can be used until it is exhausted and then discharged. The service life of the carbon bed is about 6–12 months. Alternatively, the carbon beds can be regenerated such as by steam regeneration. The streams used to regenerate the ion-exchange materials are removed via conduit 34 and conveyed to wastewater sump 118a. In addition, cleaning of the beds can be assisted by an air and/or water rinse. Also, a stream is removed from the ion-exchange treatment via conduit 31 and conveyed to sump 120. This stream is that from the mechanical backwashing of the ion-exchange materials which employed the stream conveyed via conduit 49 and obtained from tank 121. This stream removed via conduit 31 typically has a solids content of about 0.01% by weight and a pH of about 3–12. The stream conveyed via conduit 49 has a pH of about 6.5–7.5 and a solids content of about 0.01% by weight.

The treated wastewater stream is conveyed from the ion-exchange demineralizer 117 via conduit 8 to a vessel 121 for regulating the flow balance of the wastewater treatment system. In particular, the level of wastewater in holding tank or pond 105 is measured, and if it is high, the demineralized water is discharged into the environment, such as an existing lake or stream nearby, via conduit 66 or conveyed via conduit 41 to evaporator 132. The water at this stage is sufficiently pure for such discharge to the environment.

On the other hand, if the level in the holding vessel 105 is low, water such as well water is added to tank 121 via conduit 35. If the level of wastewater in holding pond or tank 105 is satisfactory whereby sufficient water is present that adequate levels can be returned to the plant for reuse, the wastewater is conducted via conduit 9 to an ion-exchange treatment for deionization of the wastewater. The deionization includes in sequence a cation-exchange bed 124, an anion-exchange bed 125, and a randomly mixed cation- and anion-exchange bed 126.

Typical cation and anion material for beds 124, 125 and 126 are the same materials discussed hereinabove for beds 118 and 123. Typically, bed 124 contains Permutit Q100 and bed 125 contains Permutit S100. Any silicic acid present in the stream is removed by beds 124 and 125.

The stream in conduit 8 has a pH of about 6.5 and a solids content of less than about 10 ppm. The temperature of the stream is about 70°–110° F. Typical flow rates are about 150 to about 250 gpm.

The stream in conduit 9 has a solids content of about 0.1% by weight, a pH of about 6.5–7.5, and a temperature of about 70°–110° F. Typical flow rates are about 150 to about 250 gpm.

The main stream of waste water obtained from the deionizer is conducted via conduit 10 to storage tank(s) 127. The conductivity of the wastewater at this stage of the process is less than 0.1 micromhos. The solids content of the stream is less than about 0.1 ppm, and the pH is about 6.5. Typical flow rates through conduits 8 and 9 are the same and are about 150 to about 175 gallons per minute for each.

Next, the demineralized water can be conveyed via conduit 11 and conduit 13 and returned to the manufacturing facility for reuse. A portion of the demineralized water if needed can be conveyed via conduit 70 to tank 121 when the level in the holding tank 103 is low. In addition, a portion of the demineralized water from the ion-exchange bed can be removed via conduit 48 and conveyed to sump 120.

The ion-exchange materials are regenerated in the same manner as discussed hereinabove for regenerating ion-exchange beds 118 and 123. The used regeneration streams which contain relatively high levels of acid ions and alkali metal materials, such as above about 1500 ppm, are conveyed to a wastewater storage tank 118a via conduit 37. Also, relatively concentrated wastewater solutions containing acid and alkali metals used to regenerate the ion-exchangers 118 and 123 are conveyed to wastewater storage tank 118a via conduit 34. A further stream of wastewater is conveyed to wastewater storage tank 118a via conduit 36 from evaporator feed tanks 129. Depending on the level of wastewater in wastewater storage facility 118a, an amount of such can be conveyed via conduit 47 to storage tank 120 and recycled or sent to an evaporating facility. If recycled such can be be conveyed via conduit 46 to diverter 104. The concentrated wastewater composition is conveyed from wastewater storage facility 118a to wastewater storage facility 131 via conduit 14.

The wastewater is then pumped via conduit 15 to evaporator feed tanks 129. In addition, used acid and/or caustic from the regeneration of the ion-exchange beds is conveyed via conduits 39 and 38, respectively, to evaporator feed tanks 129. The material is mixed in evaporator feed tanks 129 and sludge is removed from the bottom thereof. Also, excess amounts of materials in evaporator feed tanks 129 can be recycled to wastewater storage tank 118 via conduit 36. The pH of the wastewater to be treated is, if needed, adjusted to about 6.5 to about 7.5 and is then conveyed via conduit 16 to evaporator 132. Prior to the evaporator, this stream is subjected to filtration at 133 to remove large objects (e.g.—gloves, bottle caps) which may be contained in the stream. The preferred evaporator system is a mechanical vapor compression system which is very economical and efficient to use. In fact, it employs about 1/6 or less of the energy of conventional steam evaporators. Heat is supplied to the heat exchanger by conveying steam which is then compressed through the heat exchanger. Release of the compressed steam results in expansion thereof and heat is transferred to the stream of wastewater via the heat exchange. This, in turn, causes evaporation of a portion of the wastewater which is removed via conduit 42 and returned to holding tank 121 via conduit 42. The concentrated stream is removed via conduit 17 and sent to a centrifuge 134.

A typical concentrated stream contains at least about 10% of suspended crystals of alkali and/or alkaline earth metal salts, a total metals content of about 40–50% by weight, and a specific gravity of about 1.5–1.6. Typically, the salts are predominantly sodium salts such as sodium sulfate with minor or lesser amounts of calcium salts and nitrates. The effluent from the evaporator system via conduit 17 can be conveyed to an approved chemical landfill. Alternatively anhydrous crystals of sodium sulfate can be obtained by heating the composition in the centrifuge to at least about 190° F. and preferably to about 230° F. Any conventional centrifuge can be employed, an example of which is a Bird 28×18 to accommodate 1000 lbs./hour of feed.

At temperatures below 190° F. the crystals obtained would not be anhydrous and would be decahydrate crystals which are much more dense than the anhydrous crystals. The water separated from the sodium sulfate is removed via conduit 44 and can be recycled to evaporator feed tanks 129. Anhydrous refers to the state of the crystals as they emerge from the centrifuge. Such, however, substantially pick up water from the surrounding atmosphere.

What is claimed is:

1. A process for treating water which contains undesired levels of at least heavy metals, alkali metals, and organic materials which comprises:
   (a) measuring the pH of said water and adjusting said pH to about 10–11;
   (b) subjecting said water from step (a) to filtration treatment for removal of heavy metals therefrom;
   (c) subjecting the water to ion-exchange treatment wherein said ion-exchange treatment includes first subjecting said water to cation-exchange for removal of alkali metals therefrom; then subjecting the water to treatment with activated carbon for removal of organic material therefrom; and then subjecting the water to treatment with anion exchange for removal of acid ions therefrom.

2. The process of claim 1 wherein the pH is adjusted to about 10.5.

3. The process of claim 1 wherein said pH is adjusted by the addition of sodium hydroxide solution.

4. The process of claim 1 which further includes, subsequent to the anion-exchange treatment, regenerating the ion-exchange materials by contacting with water-containing compositions, obtaining waste water used for said regenerating and subjecting waste water used to regenerate the ion-exchange materials which have a concentration of dissolved solid of at least 2000 ppm to evaporation and then to centrifuging to provide a solid waste product.

5. The process of claim 4 wherein said centrifuging is carried out at a temperature of at least about 190° F. to provide a solid anhydrous waste product.

6. The process of claim 4 wherein said centrifuging is carried out at a temperature of about 230° F. to provide a solid anhydrous waste product.

7. The process of claim 4 wherein said waste product is anhydrous sodium sulfate.

8. The process of claim 4 wherein heat for said evaporation is provided to the stream of wastewater by conveying the stream of wastewater through a heat exchange zone and by providing heat in said zone by a mechanical vapor compression system.

9. The process of claim 4 wherein heat for said evaporation is provided to the stream of wastewater by conveying the stream of wastewater through a heat exchange zone and by supplying heat to said heat exchange zone by means of compressing steam in said heat exchange zone, causing said steam to expand whereby heat is transferred to said heat exchange zone.

10. The process of claim 4 wherein said evaporation is provided by a mechanical vapor compression evaporator.

11. The process of claim 1 which includes conveying said water subsequent to said pH adjustment and prior to said filtration to a first holding zone, and includes conveying said water subsequent to the anion-exchange treatment to a second holding zone for regulating the flow balance whereby when the level of water in said first holding zone is higher than a predetermined maximum, said waste from said second holding zone is discharged to the environment or conveyed to an evaporator, and when said level in said first holding zone is lower than a predetermined minimum, additional water is added to said second holding zone, and when said level in said first holding zone is between said minimum and maximum, said wastewater is conducted to a subsequent ion-exchange treatment.

12. The process of claim 11, wherein, prior to said filtration treatment, the electrical conductivity and flow rate of the water stream are measured, and, if either are greater than a predetermined maximum, the stream is diverted to an impoundment facility.

13. The process of claim 1 which further comprises subjecting the ion-exchange materials employed in said ion exchange treatment to regeneration by contacting with aqueous compositions, and subjecting the aqueous compositions used for said regeneration after use to evaporation whereby heat for said evaporation is provided to the aqueous composition by conveying the aqueous composition through a heat exchange zone and by supplying heat to said heat exchange zone by means of compressing steam in said heat exchange zone, causing said steam to expand whereby heat is transferred to said heat exchange zone.

14. A process for treating water which contains undesired levels of at least heavy metals, alkali metals, and organic materials which comprises:
   (a) measuring the pH of said water and adjusting said pH to about 10–11;
   (b) subjecting said water from step (a) to filtration treatment for removal of heavy metals therefrom;
   (c) subjecting the water of ion-exchange treatment; and
   (d) wherein, prior to said filtration treatment, the electrical conductivity and flow rate of the water stream are measured, and if either are greater than a predetermined maximum, the stream is diverted to an impoundment facility.

15. A process for treating water which contains undesired levels of at least heavy metals, alkali metals, and organic materials which comprises:
   (a) measuring the pH of said water and adjusting said pH to about 10–11;
   (b) conveying said water from step (a) to a first holding zone;
   (c) subjecting said water from step (b) to filtration treatment for removal of heavy metals therefrom;
   (d) subjecting the water to ion-exchange treatment; and
   (e) conveying said water, subsequent to said ion-exchange treatment from step (d), to a second holding zone for regulating the flow balance whereby when the level of water in said first holding zone is higher than a predetermined maximum, said waste from said second holding zone is discharged to the environment or conveyed to an evaporator, and when said level in said first holding zone is between said minimum and maximum, said wastewater is conducted to a subsequent ion-exchange treatment.

16. The process of claim 1, 14 or 15 wherein the filtration treatment includes a layer of anthracite coal on top of a layer of silica sand on top of layers of quartz rock.

17. The process of claim 16 wherein the particle size of said anthracite coal is about 1 to about 1.5 mm; the particle size of said silica sand is about 0.45 to about 0.55 mm, and the quartz rock includes an uppermost layer having a particle size of about 1/16 to about 3/16 inch, a middle layer having a particle size of about ¼ to about ½ inch, and a bottom layer having a particle size of about ¾ to about 1½ inch.

18. The process of claim 16 wherein the ratio of bed depths of said anthracite coal to said silica sand to said quartz rock is about 0.8:1:1.

19. The process of claim 16 wherein the layers of coal, sand and rock include a thin film of $CaCO_3$ on the surface.

20. The process of claim 1 or 15 wherein prior to the filtration treatment, the electrical conductivity and flow rate of the water stream are measured, and if either are greater than a predetermined maximum, the stream is diverted to an impoundment facility.

21. The process of claim 11 or 15 wherein said subsequent ion-exchange treatment includes in sequence cation-exchange treatment followed by anion-exchange treatment followed by a mixed cation- and anion-exchange treatment.

22. The process of claim 21 wherein the stream subjected to said subsequent ion-exchange is conveyed for reuse.

23. The process of claim 1, 14 or 15 which includes treatment of wastewater from the manufacture of batteries.

24. The process of claim 1, 14 or 15 wherein the water treated is wastewater from the manufacture of cadmium-nickel batteries or from lead-acid batteries or from both.

25. The process of claim 1, 14 or 15 which further comprises subjecting the ion-exchange materials employed in said ion exchange treatment to regeneration by contacting with aqueous compositions, and subjecting the aqueous compositions used for said regeneration after use to evaporation whereby heat for said evaporation is provided to the aqueous compositions by conveying the aqueous compositions through a heat exchange zone and by providing heat in said zone by a mechanical vapor compression system.

26. The process of claim 1, 14 or 15 which further comprises after the ion-exchange treatment, subjecting at least a portion of said water to evaporation whereby heat for said evaporation is provided to the water by conveying the water through a heat exchange zone and by providing heat in said zone by a mechanical vapor compression system.

27. The process of claim 1, 14 or 15 which further comprises after the ion-exchange treatment, subjecting at least a portion of said water to evaporation whereby heat for said evaporation is provided to the water by conveying the water through a heat exchange zone and by supplying heat to said heat exchange zone by means of compressing steam in said heat exchange heat, causing said steam to expand whereby heat is transferred to said heat exchange zone.

* * * * *